United States Patent [19]
Neill

[11] Patent Number: 4,540,199
[45] Date of Patent: Sep. 10, 1985

[54] JACK BOLT ASSEMBLY

[76] Inventor: David C. Neill, Box EE, Anahuac, Tex. 77514

[21] Appl. No.: 413,883

[22] Filed: Sep. 1, 1982

[51] Int. Cl.³ .............................................. F16L 35/00
[52] U.S. Cl. ....................................... 285/27; 285/50; 285/363; 29/256
[58] Field of Search ................... 403/16, 21, 335, 336, 403/337; 285/363, 405, 18, 20, 412, 27, 368, 50; 29/239, 256, 263–265

[56] References Cited

U.S. PATENT DOCUMENTS

| | | | |
|---|---|---|---|
| 764,603 | 7/1904 | Lambert | 285/DIG. 7 |
| 1,707,870 | 4/1929 | Morton . | |
| 1,766,623 | 6/1930 | Frey | 285/363 X |
| 1,852,521 | 4/1932 | Hill . | |
| 2,393,795 | 1/1946 | Miller . | |
| 2,654,569 | 10/1953 | Cooper . | |
| 3,620,554 | 11/1971 | Ward et al. | 285/363 X |
| 3,711,920 | 1/1973 | Simmons . | |
| 3,749,426 | 7/1973 | Tillman | 285/363 X |
| 3,997,957 | 12/1976 | Tone et al. . | |
| 4,015,324 | 4/1977 | Lutter . | |
| 4,027,373 | 6/1977 | Kwast et al. . | |
| 4,092,236 | 5/1978 | Sato et al. | 285/337 |
| 4,209,177 | 6/1980 | Hull | 285/368 |

Primary Examiner—Dave W. Arola
Attorney, Agent, or Firm—Glaser, Griggs & Schwartz

[57] ABSTRACT

A jack bolt assembly for separating joined first and second flange members of a flange assembly including a longitudinally extending, generally rod-shaped jack bolt member adapted to extend between first and second flange members of the flange assembly and a thrust member, the jack bolt member having a primary threaded portion for threadedly engaging at least one of the openings formed in the first flange member, a radial engaging surface, and a thrust member receiving portion in axial alignment with the primary threaded portion, the thrust member mounted with the thrust member receiving portion and between the first and second flange members for separating the flange members of the flange assembly upon rotation of the jack bolt member with respect to the first flange member of the flange assembly.

6 Claims, 7 Drawing Figures

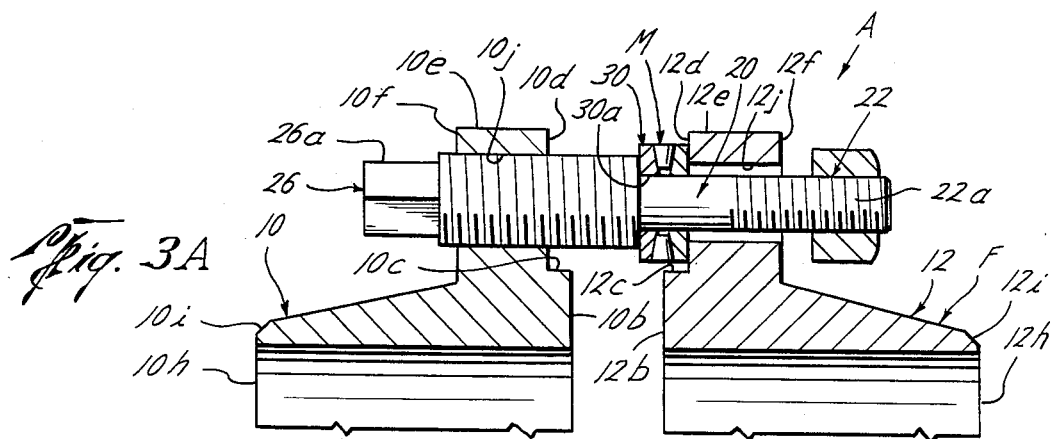
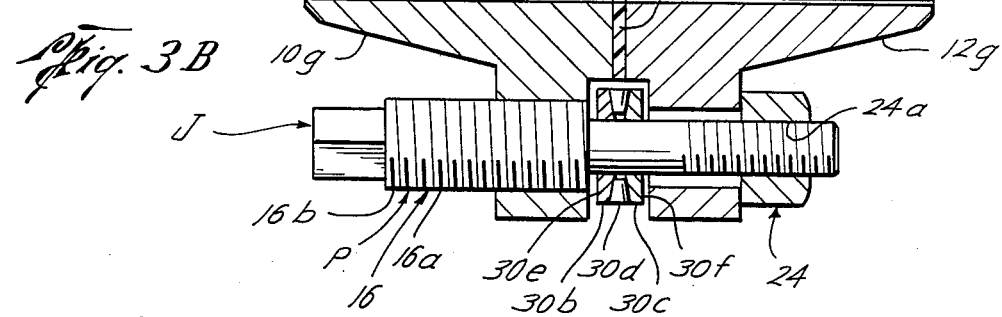
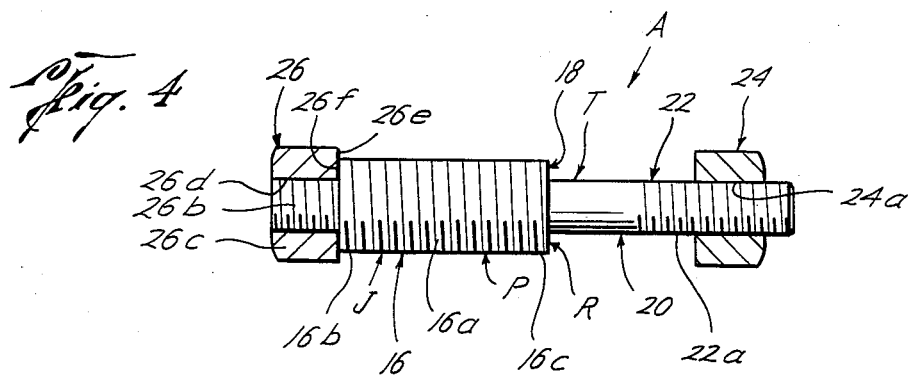

JACK BOLT ASSEMBLY

FIELD OF THE INVENTION

The field of this invention relates to devices utilized in conjunction with flowline flanges, particularly of the type used in securing flange members together as well as used in separating the mating flanges.

BACKGROUND OF THE INVENTION

Mating flanges that have been tightly secured together have historically posed difficulties in their disassembly. Typically, mating flanges having a plurality of aligned openings for receiving bolts and the like, after being tightly assembled for periods of time, pose service difficulties in the bolt removal-flange separation process. Some systems are of a construction too light to handle the necessary loads for separating the joined flanges when release is desired, while others provide no support or alignment capabilities during the separating phase of the mating flange portions.

Efforts have been made to separate various types of flanges and include those such as taught in U.S. Pat. Nos. 1,707,870; 1,852,521; 2,393,795; 2,654,569; 3,711,920; and 3,997,957. Some devices of the prior art such as disclosed in U.S. Pat. No. 4,027,373, teach the use of devices which can be used both as a flange bolt and as a flange spreader. Furthermore, U.S. Pat. No. 4,015,324 discloses a device for separating flange pipes using a cammed, threaded bolt arrangement. Other types of devices have included those wherein one of the mating faces of a pair of flanges has a threaded opening machined therein to receive a threaded member, not aligned with the openings for fastening the flange together. This threaded opening permits a threaded bolt to engage a nut mounted in a countersunk opening formed in the mating flange face for use in separating the mating flange members.

However, so far as known, no flange separating device that remains in service as a fastener for the flange, serves double duty as a jack bolt for separating the flange members, while providing both support and alignment of the flanges while the separating flanges are forced apart. The support and alignment of the flanges during the separation of the mating flanges is important to prevent twisting and slipping of opposing flange faces with respect to one another while reducing the risk of damage to the flange yet requiring a minimum of tools and time to accomplish same.

SUMMARY OF THE INVENTION

The present invention relates to a new and improved jack bolt assembly for separating first and second flange members of a releasably secured flange assembly including a jack bolt member extending between the flange members of the flange assembly. The jack bolt member is of a longitudinally extending generally rod-shaped configuration and includes a primary threaded portion for threadedly engaging one of the openings in the first flange member, a radial engaging surface formed adjacent to the primary threaded portion, a thrust member receiving portion formed adjacent to the threaded portion and axially aligned therewith, with the thrust member receiving portion partially extending into the aligned opening formed in the second flange member of the flange assembly. The jack bolt assembly further includes a thrust member movably mounted with the thrust member receiving portion for abutting the radial engaging surface and second flange member upon initial rotation of the primary threaded portion, the engagement of the thrust member with the second flange member for separating the first and second flange members of the flange assembly upon continued rotation of the primary threaded portion.

BRIEF DESCRIPTION OF THE DRAWINGS

FIG. 3A discloses a sectional, elevational view, similar to FIGS. 1A and 2A, showing a flange assembly having been separated by use of a jack bolt assembly of a third embodiment of the present invention;

FIG. 3B discloses a sectional, elevational view, similar to FIGS. 1B and 2B, showing the jack bolt assembly of FIG. 3A for securing the flange members of the flange assembly together; and, FIG. 4 shows an elevational, partially sectional view of an alternative embodiment of the jack bolt member of the jack bolt assembly of the present invention.

DESCRIPTION OF A PREFERRED EMBODIMENT

Figure 1A:
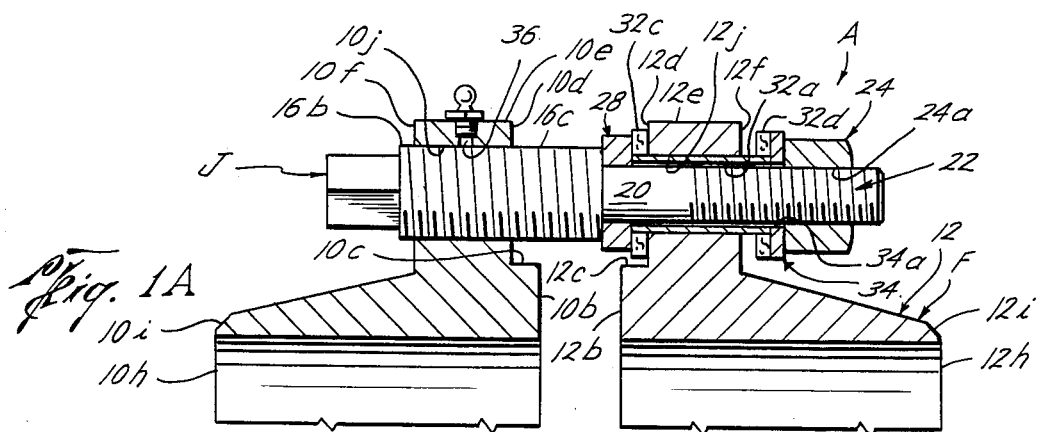
FIG. 1A is a sectional, elevational view, showing a flange assembly having been separated by use of the jack bolt assembly of the first embodiment of the present invention.

In the drawings, the jack bolt assembly of the present invention is designated generally by the letter A. The jack bolt assembly A is adapted to be used in conjunction with a flange assembly F, with the jack bolt assembly A including a jack bolt member J and a thrust member M. The jack bolt member J further includes a primary threaded portion P, a radial engaging surface R and a thrust member receiving portion T for receiving the thrust member M. Unless otherwise specified, it is preferred that the jack bolt assembly A of the present invention be formed of suitable high strength material such as stainless steel and the like, all capable of withstanding the typically high tension and compressive forces along with an ability to withstand adverse environmental conditions typically encountered in use with flange assemblies.

The jack bolt assembly A of the present invention is adapted to be used for separating a releasably secured flange assembly F. The flange assembly F as generally depicted in FIGS. 1–3, typically includes a first flange member 10 and a second member 12. Typically, the first and second flange members 10, 12, are formed having alinged bores 10a, 12a that are adapted to be in substantial axial alignment with one another when the first and second flange members 10, 12 are suitably affixed together. The flange members 10, 12 are adapted to be releasably secured with the jack bolt assembly A of the present invention, such that the mating radial surfaces 10b, 12b, respectively, are adapted either to engage one another directly upon proper make-up between the first and second flange members 10, 12 of the flange assembly F or, as depicted in the drawings, a suitable member 14 may be disposed therebetween. The member 14 may be formed having a bore 14a that is adapted to be axially aligned with bores 10a, 12a of the first and second flange members 10, 12, respectively, and with an annular portion 14b adapted to be disposed between the mating radial surfaces 10b, 12b of the first and second flange members 10, 12. The member 14 may include a gasket, a slip blind, a spectacle blind, a steaming blind or any other type of structure that is adapted to be installed between the opposing mating radial surfaces 10b, 12b of flange members 10, 12 of the flange assembly F. The member 14 may also include valves of any type and variety or any other types of structures typically found to be mountable with and between the flange members 10, 12 of flange assembly F.

The flange members 10, 12 typically are formed having an inner annular surface 10c, 12c formed adjacent to mating radial surfaces 10b, 12b, respectively, with inner radial flange ring surfaces 10d, 12d formed adjacent to the inner annular surfaces 10c, 12c, respectively. Outer annular surfaces 10e, 12e are formed adjacent to the inner radial flange ring surfaces 10d, 12d, with outer radial flange ring surfaces 10f, 12f formed adjacent to the outer annular surfaces 10e, 12e, respectively, and substantially parallel with the inner radial flange ring surfaces 10d, 12d. Typically the housings 10g, 12g of the first and second flange members 10, 12, respectively, are adapted to be mounted with a suitable flowline (not shown) adjacent ends 10h, 12h by typical weldments at weldment portions 10i, 12i or by any other suitable means.

Accordingly, the first flange member 10 would be connected with an appropriate flowline (not shown) and the second flange member 12 would be connected to an appropriate flowline (not shown), with the flowlines connected with the first and second flange members 10, 12 thus being joined by proper make-up of the flange assembly F. Preferably, the first and second flange members 10, 12 are formed having a plurality of openings 10j, 12j with the openings 10j, 12j adapted to be axially aligned with one another such that for each opening 10j formed in the first flange member 10, a corresponding axially aligned opening 12j is formed in the second flange member 12. Preferably, the openings 10j, 12j are formed substantially parallel with the bores 10a, 12a and extend between the inner and outer radial flange ring surfaces 10d, 12d, 10f, 12f, respectively. To the extent that the flange assembly F is joined together and made up by conventional bolt and nut assemblies (not shown), the openings 10j, 12j may be of the same diameter. However, as discussed more fully hereinbelow, to the extent that the openings 10j, 12j are adapted to receive the jack bolt assembly A of the present invention such may not be the case.

The jack bolt assembly A of the present invention is adapted to be used for separating the joined first and second flange members 10, 12 of the releasably secured flange assembly F. The jack bolt assembly A includes a jack bolt member J which is adapted to extend between the first and second flange members 10, 12 of the flange assembly F. Preferably, the jack bolt member J is of a longitudinally extending, generally rod-shaped configuration and has generally, a primary threaded portion P, a radial engaging surface R, and a thrust member receiving portion T. The primary threaded portion P of the jack bolt member J includes a threaded portion 16 formed having a plurality of threads 16a formed on the outer annular surface thereof, with the threads 16a extending from and between the first end 16b and the second end 16c. The radial engaging surface R is formed adjacent to the primary threaded portion P such that the radial engaging surface R includes radial surface 18 formed adjacent to the second end 16c of the threaded portion 16 of the primary threaded portion P. Preferably the radial engaging surface R extends radially inwardly from the primary threaded portion P.

The jack bolt member J further includes a thrust member receiving portion T which includes receiving portion 20 which is formed adjacent to the primary threaded portion P and radial engaging surface R. Preferably, the thrust member receiving portion T is axially aligned with the primary threaded portion P. A secondary threaded portion 22 is preferably formed adjacent and in axial alignment with the thrust member receiving portion T and is preferably formed having a plurality of threads 22a formed about the outer annular surface thereof. A securing member 24 is adapted to threadedly engage the threads 22a of the secondary threaded portion 22 by means of compatibly formed threads 24a formed therewith. The securing member 24 may include any type suitable nut or the like.

The jack bolt member J of the present invention further includes a tool engaging end, designated generally as 26, formed with the primary threaded portion P and in axial alignment therewith for enhanced ease of rotation of the jack bolt member J as discussed more fully hereinbelow. As shown in FIGS. 1–3, the tool engaging end 26 is preferably formed of a configuration compatible with a tool 27 (FIG. 2A) to be used for rotation of the jack bolt member J by engagement of the tool faces 27a of the tool 27 with the tool engaging end 26. As shown in FIGS. 1–3, the outer surface configuration of the tool 27 is that of a multiple-sided figure having sides 26a. The sides 26a may form any suitable configuration such as that of a triangle, square, rectangle, hexagon or any other suitable configuration that is desired, with the tool faces 27a being compatibly formed to engage such sides 26a of the tool engaging end 26. Alternatively, the tool engaging end 26 may include an offset threaded portion 26b and a drive member 26c, as best seen in FIG. 4. Preferably, the offset threaded portion is formed adjacent to the primary threaded portion P and in axial alignment therewith adjacent end 16b. The drive member 26c is formed having threads 26d which are adapted to be threadedly engageable and mountable with the offset threaded portion 26b. For the reasons set forth hereinbelow, it is preferred that the drive member 26c be of the same outer surface configuration as that of the securing member 24. Preferably, when the drive member 26c is properly threaded onto the offset threaded portion 26b, the end surface 26e of the drive member 26c engages radial surface 26f extending the offset threaded portion 26b and threads 16a of the threaded portion 16 adjacent to the first end 16b. As a result, any rotational inputs by tool 27 acting upon the tool engaging end 26 will result in rotation of the jack bolt member J.

The jack bolt assembly A of the present invention further includes a thrust member M movably mounted with the thrust member receiving portion T, with the thrust member M adapted to be disposed between the first and second flange members 10, 12 of the flange assembly F. As shown in FIGS. 1 and 2, the thrust member M includes a thrust washer 28 formed having a bore 28a, radial surfaces 28b, 28c and an outer annular surface 28d. Alternatively, the thrust member M may include a thrust bearing 30 (FIG. 3) having a bore 30a, races 30b, 30c, bearings 30d, and radial surfaces 30e, 30f. Either the thrust washer 28 or thrust bearing 30 is adapted to be disposed about the thrust member receiving portion T of the jack bolt member J such that either bore 28a, 30a of the thrust washer 28 or thrust bearing 30 is adapted to be receivably mounted about the receiving portion 20.

As best seen in FIG. 1, the jack bolt assembly A of the present invention may further include insulation means designated generally as 32, which is adapted to be mounted about the receiving portion 20 and secondary portion 22 of the jack bolt member J, in the opening 12j formed in the second flange member 12. As such, the insulation means 32 is formed having a bore 32a for receiving the receiving portion 20 and secondary threaded portion 22 therein and an outer annular surface 32b adapted to be disposed within the opening 12j. Furthermore, insulation means 32 includes end flanges or washers 32c, 32d such that end flange 32c is adapted to be disposed between inner radial flange ring surface 12d of second flange member 12 and the thrust member M, while end flange 32d is adapted to be disposed between the outer radial flange ring surface 12f and the securing member 24. A washer 34 may be disposed between the securing member 24 and the end flange 32d as desired. The washer 34 is formed having a suitable bore 34a such that the washer 34 may be received on the secondary threaded portion 22 of the jack bolt member J. The insulation means 32 may be used in conjunction with the jack bolt mamber J and thrust member M in forming the jack bolt assembly A of the present invention for insulating the jack bolt member J from a harmful electrical flow such as unwanted electrolysis or a voltage differential across the flange members 10, 12 and/or for eliminating the corrosive effects of the environment. The insulation means 32 may preferably be formed of any suitable fiber material capable of withstanding and preventing the undesired electrolysis effects.

In the use or operation of the jack bolt assembly A of the present invention, it is contemplated that the first and second flange members 10, 12 of the flange assembly F are secured together by a plurality of pairs of nut and bolt assemblies (not shown) to be primarily used in securing the first and second flange members 10, 12 together. It is preferred that the jack bolt assembly A of the present invention be used in lieu of two of such nut-bolt assemblies with two complete jack bolt assemblies A being mountable with the flange assembly such that they are 180° apart. The jack bolt assemblies A are adapted to be used to both connect the flange members 10, 12 as well as separate the connected flange members 10, 12 when removal is desired. Typically, such separation requires considerable force and is somewhat difficult in the accomplishment thereof. By utilization of the jack bolt assembly A of the present invention, such procedure is not only simplified, but also made more effective and requires less additional tools for doing same. Any number of jack bolt assemblies A may be used in lieu of conventional bolt-nut arrangements, but it is preferred that such be evenly disposed about the perimeter of the flange ring of the flange assembly F. For example, if three such jack bolt assemblies A were to be used, they should be spaced at 120° intervals about the flange assembly F; if four should be used, then such should be spaced at 90° intervals about the flange assembly F, and so forth. This enhances th ability to provide a substantially equal, coordinated separating force to be exerted by the jack bolt assembly A during the spreading apart of the mating flange members 10, 12, as discussed more fully hereinbelow.

Figure 1B:
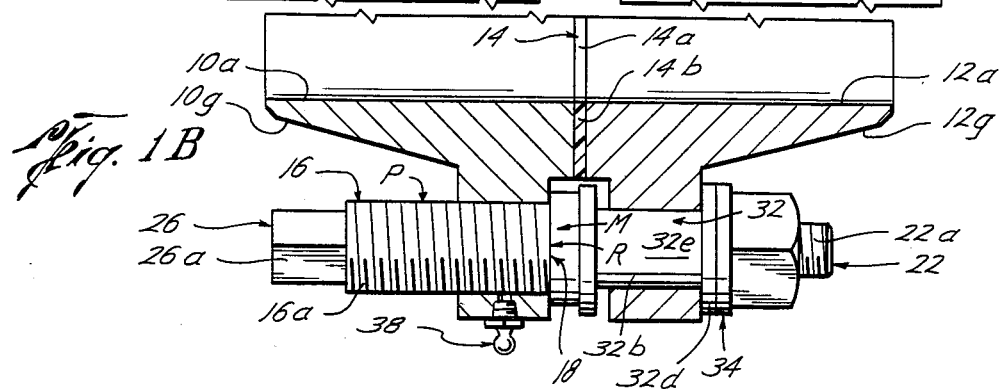
FIG. 1B is a sectional, elevationl view, similar to FIG. 1A, showing the jack bolt assembly of FIG. 1A as used in securing the flange members of the flange assembly together.
Figure 2A:
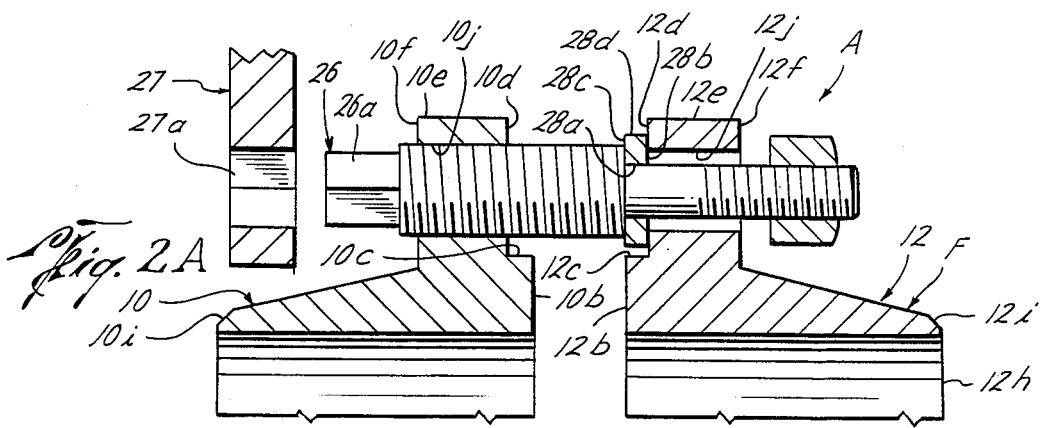
FIG. 2A is a sectional, elevational view, similar to FIG. 1A, depicting the separated flange members of the flange assembly utilizing a second embodiment of the jack bolt assembly of the present invention.
Figure 2B:
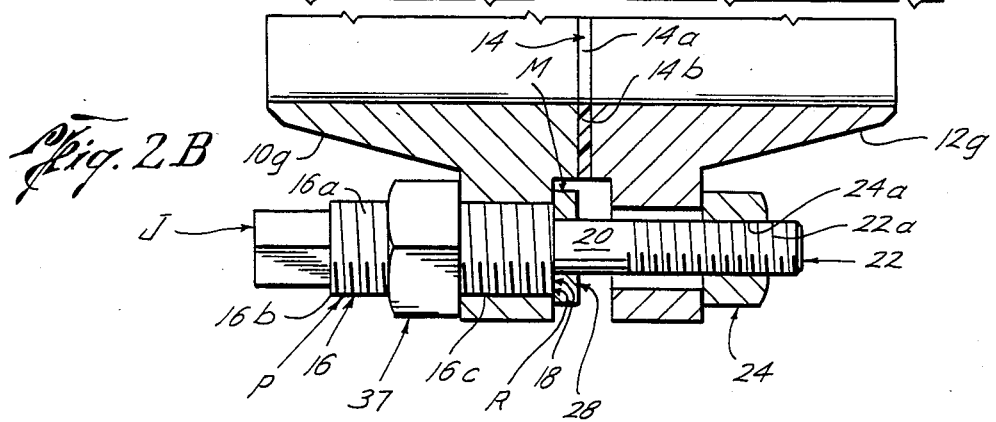
FIG. 2B is a sectional, elevational view, similar to FIG. 1B showing the jack bolt assembly of FIG. 2A as used in securing the flange members of the flange assembly together.

As shown in FIGS. 1B, 2B, 3B, the jack bolt assembly A is preferably mounted with the flange assembly F such that the primary threaded portion P is threadedly received in a suitably formed threaded opening 10j formed in the first flange member 10, with the thrust member M disposed between the inner radial flange ring surfaces 10d, 12d of the flange members 10, 12, respectively, while the receiving portion 20 and secondary threaded portion 22 extend thereinto and through the opening 12j formed in the second flange member 12. A suitable securing member 24 is threadedly received on the secondary threaded portion 22 and allows for proper make-up of the first and second flange members 10, 12 upon proper tightening of the securing member 24 on the secondary threaded portion 22. In such a tightened configuration, the thrust member M may be loosely disposed within the cavity formed by the inner radial flange ring surfaces 10d, 12d and inner annular surface 10c, 12c. Thus, tightening of the securing member 24 results in conventional tightening of the flange members 10, 12 for proper make-up operations. As a result, each jack bolt assembly A is in place with the flange assembly F and is available for use at any time when it becomes necessary to spread the first and second flange members 10, 12 with respect to one another.

Upon the need arising for separating the flange members 10, 12, for example, to replace the member 14, all conventional bolt-nut assemblies should be loosened. Thereafter, the tool 27 should be placed in engagement with the tool engagement end 26 of the jack bolt member J. By proper rotation of the jack bolt member J, the thrust member M abutts the radial engaging surface R adjacent the second end 16c of the threaded portion 16, thus forcing the thrust member M to the right as viewed in FIGS. 1–3. Continued rotation of the jack bolt member J by the tool engaging the tool engaging end 26 results in the thrust member M engaging the inner radial flange ring surface 12d of the second flange member 12 (FIGS. 2 and 3) with there being full-face contact therebetween. Continued rotation results in the thrust member M moving to the right as viewed in FIGS. 1–3 for exerting a separating force on the second flange member 12 with respect to the first flange member 10. Continued rotation of the threaded portion 16 with respect to the threaded opening 10j results in continued loading on the thrust member M by virtue of the action between the radial engaging surface 18 of the jack bolt member J acting upon the thrust member M, through the thrust member M to act upon the second member 12 for separating the second flange member 12 from the first member 10 to effectuate the jacking apart of the flange members 10, 12. Of course, as multiple jack bolt assemblies A are used in jacking apart the flange assembly F, it is desired that there be some uniformity in the application of the jacking force such that partial jacking forces should be somewhat equally applied by all jack bolt assemblies A for insuring proper, ligned separation of the flange members 10, 12.

As shown in FIGS. 2 and 3, it is preferred that the receiving portion 20 and secondary threaded portion 22 be of a diameter slightly less than that of the opening 12j such that it may perform the function of an ordinary, conventional bolt when not used in separating operations, but for enhanced ease of use during normal securing operations. Furthermore, the difference between diameters between the thrust member receiving portion T and the opening 12j permits the utilization of insulation means 32 (FIG. 1) if such is desired. It should be noted that in the event that the insulation means 32 is utilized, the sleeve 32e thereof is sized such that when the flange is made up (FIG. 1B) there are no compression loads within the sleeve 32e due to the action between the securing means 24 acting upon washer 34 and the thrust member M. If this condition is satisfied, then upon jacking or separating operations, the sleeve 32e will not be damaged as the entire jack bolt assembly A is rotated with respect to the threaded opening 10j formed in the first flange member 10. As such, it is to be noted that in the event that it is desired that the tightening and loosening operations all be accomplished with the same size tool 27, then the jack bolt assembly A may include the drive member 26c of the tool engaging end 26 to allow the tool 27 to rotate not only the drive member 26c but also the securing member 24 (FIG. 4).

Thus, it will be appreciated that the jack bolt assembly A of the present invention may be adapted to be used on any existing flange by merely threading the flange openings (i.e., opening 10j) in such a matter that they may compatibly receive the primary threaded portion P of the jack bolt member J. In most cases, the jack bolt assembly A of the present invention may be retrofit on existing flanges without disrupting service or causing shutdowns. Thus, the jack bolt assembly A of the present invention provides a dual purpose, in that it is capable of being used not only to secure together first and second flange members 10, 12 of a flange assembly F, but also to be used in supporting, aligning and separating the mating flange members 10, 12. Typically, it is not uncommon for flange members 10, 12 to be misaligned, either axially, radially, or otherwise, when disassembled. With potentially dangerous misaligning forces capable of injury to operating personnel. However, the jack bolt assembly A of the present invention permits loosening or tightening operations to easily and safely proceed without undue risks to the operations due to such misalignment forces.

An additional locking member such as jam nut 37 (FIG. 2B) may be provided to threadedly engage that portion of the primary threaded portion P extending outwardly beyond the first flange member 10 for engaging th outer radial flange ring surface 10f of the first flange member 10 for enhanced locking and securing of the jack bolt member J with the flange assembly F in a secured position, as may be desired. Further, it will be appreciated that the thrust member M is in a location between the flange members 10, 12 that provides ease of access for lubrication thereof during separating operations, as is necessary. If additional lubrication is deemed necessary for the threaded coaction between the primary threaded portion P and the threaded opening 10j of the first flange member 10, a suitable lubrication port 36 in communication with lubrication fitting 38 (FIG. 1) may be utilized for receiving added lubricant as is needed.

Thus, the jack bolt assembly A of the present invention provides a new and improved apparatus capable of not only being used for securing together flange members 10, 12 of a flange assembly F but also capable of being used for the efficient separation, alignment, and support of mating flange members 10, 12 of a flange assembly F upon disassembly thereof.

The foregoing disclosure and description of the invention are illustrative and explanatory thereof, and various changes in the size, shape and materials, as well as in the details of the illustrated construction may be made without departing from the spirit of the invention.

I claim:

1. In a releasable flange assembly of the type having first and second flange members each adapted for attachment to make-up end portions of first and second flowlines, respectively, with said releasable flange assembly joining said first flowline in fluid communication with said second flowline when said first and second flange members are secured in a make-up union, and fluid communication between said first and second flowlines being interrupted when said flange members are spread, the first and second flange members each having a corresponding number of aligned openings for receiving tightening bolts, at least one of said aligned openings in said first flange member being threaded, the improvement comprising a jack bolt assembly received in an aligned pair of said flange openings for securing, separating and aligning said flange members during make-up and spread operations, said jack bolt assembly having a primary threaded shaft portion for threadedly engaging the threads in said at least one of the openings formed in the first flange member, a tool engaging end formed with said primary threaded shaft portion for rotation of said jack bolt shaft as desired, a radially engaging surface formed adjacent said primary threaded shaft portion, said radial engaging surface extending radially inwardly from said primary threaded shaft portion, a thrust member receiving portion formed adjacent to said primary threaded shaft portion and said radial engaging surface, said thrust member receiving portion being aligned with said primary shaft portion and adapted to extend into the aligned opening formed in the second flange member;

a secondary threaded portion formed adjacent to and in axial alignment with said thrust member receiving portion and adapted to be disposed within the opening formed in the second flange member and adapted to extend outwardly therefrom;

a thrust member movably mounted on said thrust member receiving portion, said thrust member being disposed between the first and second flange members of the flange assembly, said thrust member abutting said radial engaging surface and the second flange member upon initial rotation of said primary threaded shaft portion, the engagement of said thrust member with the second flange member separating the first and second flange members of the flange assembly upon continued rotation of said primary threaded portion; and, a securing member threadedly engaging said secondary threaded portion of said jack bolt member, said securing member releasably abutting the second flange member of the flange assembly for releasably securing the second flange member with the first flange member of the flange assembly upon threaded, tightening action between said securing member and the second flange member.

2. The improvement as defined in claim 1, wherein: said thrust member includes a thrust washer.

3. The improvement as defined in claim 1, wherein: said thrust member includes a thrust bearing.

4. The improvement as defined in claim 1, wherein: said tool engaging end is formed of a configuration compatible with a tool to be used for rotation of said jack bolt member by engagement ith said tool engaging end.

5. The improvement as defined in claim 4, wherein said tool engaging end includes:

an offset threaded portion formed adjacent to said primary threaded portion and in axial alignment therewith; and, a drive member threadedly mounted with said offset threaded portion for enhancing the ease of rotation of said jack bolt member.

6. The improvement as defined in claim 1, further including:

insulation means interposed between said jack bolt assembly and said flange assembly for insulating the first and second flange members from a harmful electrical flow.

* * * * *

UNITED STATES PATENT AND TRADEMARK OFFICE
CERTIFICATE OF CORRECTION

PATENT NO. : 4,540,199
DATED : September 10, 1985
INVENTOR(S) : David C. Neill

It is certified that error appears in the above-identified patent and that said Letters Patent is hereby corrected as shown below:

Column 2, Line 13, "elevationl" should be -- elevational --;

Column 4, Line 57, "26f extending the" should be -- 26f extending between the --;

Column 5, Line 34, "jack bolt mamber J" should be -- jack bolt member J --;

Column 6, Line 3, "enhances th ability" should be -- enhances the ability --;

Column 6, Line 35, "conventinal" should be -- conventional --;

Column 6, Line 64, "proper, ligned separation" should be -- proper, aligned separation --;

Column 7, Line 50, "ing th outer" should be -- ing the outer --.

Signed and Sealed this

Tenth Day of December 1985

[SEAL]

Attest:

DONALD J. QUIGG

Attesting Officer

Commissioner of Patents and Trademarks